US009003705B1

(12) United States Patent
Solowiej

(10) Patent No.: US 9,003,705 B1
(45) Date of Patent: Apr. 14, 2015

(54) AUTOMATIC PET DOOR FOR LARGE PETS

(71) Applicant: Henry E. Solowiej, Costa Mesa, CA (US)

(72) Inventor: Henry E. Solowiej, Costa Mesa, CA (US)

( * ) Notice: Subject to any disclaimer, the term of this patent is extended or adjusted under 35 U.S.C. 154(b) by 0 days.

(21) Appl. No.: 14/225,862

(22) Filed: Mar. 26, 2014

(51) Int. Cl.

| | |
|---|---|
| ***E05F 11/52*** | (2006.01) |
| ***E05F 1/00*** | (2006.01) |
| ***E05F 15/20*** | (2006.01) |
| ***A01K 1/035*** | (2006.01) |

(52) U.S. Cl.
CPC ............. *E05F 15/2023* (2013.01); *A01K 1/035* (2013.01); *E05F 15/2076* (2013.01)

(58) Field of Classification Search
USPC .................................... 49/169, 170, 360, 445
See application file for complete search history.

(56) References Cited

U.S. PATENT DOCUMENTS

| | | | | |
|---|---|---|---|---|
| 4,322,913 | A * | 4/1982 | Himmer | 49/168 |
| 5,072,544 | A * | 12/1991 | Breck, Jr. | 49/264 |
| 5,177,900 | A * | 1/1993 | Solowiej | 49/363 |
| 6,560,926 | B1 * | 5/2003 | Gillett | 49/169 |
| 6,691,463 | B1 * | 2/2004 | Richmond | 49/360 |
| 6,966,147 | B2 * | 11/2005 | Solowiej | 49/169 |
| 8,595,976 | B1 * | 12/2013 | Solowiej et al. | 49/169 |
| 8,854,215 | B1 * | 10/2014 | Ellis | 340/573.3 |
| 2007/0234643 | A1 * | 10/2007 | Siegal et al. | 49/360 |

* cited by examiner

*Primary Examiner* — Jerry Redman
(74) *Attorney, Agent, or Firm* — Vladi Khiterer

(57) ABSTRACT

An automatic pet door for large pets is installed in a hinged door and is actuated by a magnet worn by a pet. Unintended openings of the automatic pet door caused by the Earth's ambient magnetic field when the hinged door is moved are prevented by a system that includes a microelectromechanical systems gyro. A counterweight system allows the use of a relatively small and inexpensive electric motor to actuate the automatic pet door.

13 Claims, 6 Drawing Sheets

AUTOMATIC PET DOOR FOR LARGE PETS

FIELD OF THE INVENTION

The present invention pertains to an automatic pet door for large pets actuated by a magnet worn by a pet that prevents unintended openings caused by the Earth's ambient magnetic field.

BACKGROUND OF THE INVENTION

Automatic pet doors actuated by a magnet worn by a pet have numerous advantages over other types of automatic pet doors. These advantages include preventing unauthorized pets from opening the pet door, allowing the authorized pets to open the pet door without having to force it open, being relatively secure against burglars, reliably weatherproof and inexpensive to provide and install.

However, automatic pet doors actuated by a magnet worn by a pet of the prior art have a disadvantage, namely, either they only work for small pets or they require a large and expensive electric motor to accommodate larger and heavier pet doors for large pets. Specifically, a pet door for a 100 to 200 lb dog would have to be about 36"×14", or even larger and weigh about 10 lb. or more. Such a heavy pet door requires at least a 3 Amp electric motor to actuate. A 3 Amp electric motor is quite expensive and also large in size, therefore difficult to install inside a rather slender frame for the automatic pet door assembly.

Therefore, there is a need for an automatic pet door for large pets actuated by a magnet worn by a pet that does not require a large and expensive electric motor.

SUMMARY OF THE INVENTION

The present invention satisfies this need. It comprises a counterweight means biasing the pet door towards an open position, thus, eliminating the need for a large and expensive electric motor.

BRIEF DESCRIPTION OF THE DRAWING FIGURES

DETAILED DESCRIPTION OF THE PREFERRED EMBODIMENT

This invention will be better understood with the reference to FIG. 1 through FIG. 6. The same numerals indicate the same elements in all drawing figures.

Figure 1:
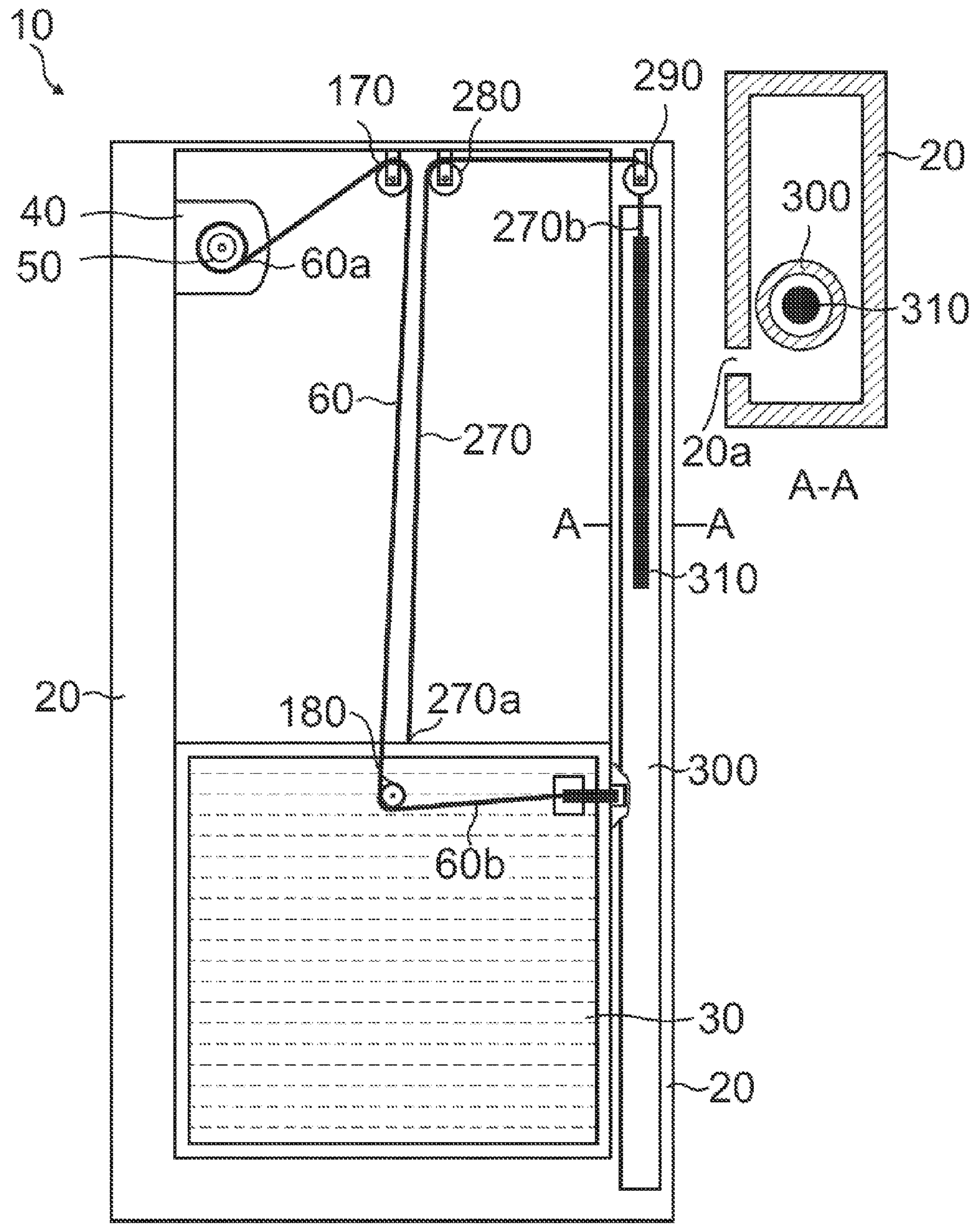
FIG. 1 shows an automatic pet door for large pets according to the preferred embodiment of this invention with the pet door in the closed position.
Figure 2:
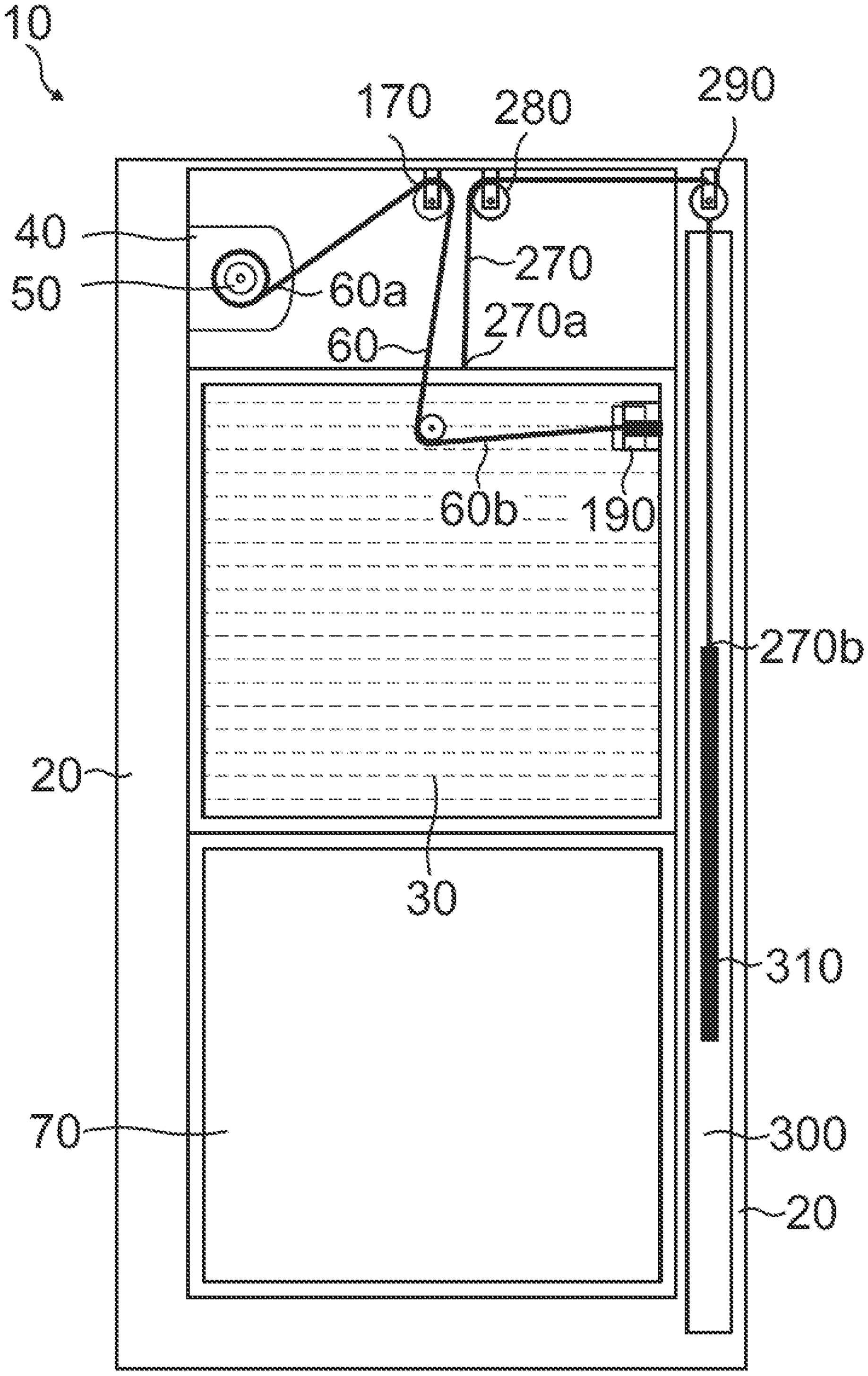
FIG. 2 shows an automatic pet door for large pets according to the preferred embodiment of this invention with the pet door in the open position.

Viewing, simultaneously, FIG. 1 and FIG. 2, numeral 10 indicates a frame. Frame 10 is of a substantially rectangular shape and is disposed over an opening in a hinged door indicated by numeral 70 in FIG. 2. Frame 10 can also be installed in a sliding door, such as a patio slider. The hinged door itself is not shown in FIG. 1 and FIG. 2. A lower portion of frame 10 defines a passage through opening 70 used by pets to pass through opening 70. In the preferred embodiment, opening 70 is about 36"×14" to accommodate a 100-200 lb dog.

Numeral 30 indicates a pet door. Pet door 30 is movable between a lower closed position shown in FIG. 1 and an upper open position shown in FIG. 2 by a drive means. In the preferred embodiment, pet door 30 weighs about 10 lb.

In the preferred embodiment shown in FIG. 1 and FIG. 2, frame 70 comprises two substantially parallel vertical outer tubes indicated by numeral 20. Outer tubes 20 have a rectangular cross section. In the preferred embodiment, outer tubes 20 are made from extruded aluminum and measure 2"×4".

Outer tubes 20 have channels indicated by numeral 20*a*. Channels 20*a* are disposed along the length of outer tubes 20, such that openings of channels 20*a* are facing each other and slidably receive pet door 30. Further, in the preferred embodiment shown in FIG. 1 and FIG. 2, the drive means comprises a motor indicated by numeral 40. Motor 40 is disposed on frame 10. Numeral 50 indicates a first pulley. First pulley 50 is disposed on motor 40.

Numeral 60 indicates a first cable. First cable 60 has a first end indicated by numeral 60*a* and a second end indicated by numeral 60*h*. First end 60*a* is fixedly attached to primary pulley 50 and second end 60*b* is fixedly attached to pet door 30.

When motor 40 is energized, it spins first pulley 50 causing first cable 60 to pull pet door 30 to the open position shown in FIG. 2. When motor 40 is not energized, pet door 30 is allowed to move down to the closed position shown in FIG. 1 by way of the force of gravity. In the preferred embodiment described in reference to FIG. 1 and FIG. 2, there is also a clutch allowing first pulley 50 to slip while motor 40 is energized and pet door 30 is in the open position.

In the preferred embodiment, there is also a second pulley indicated by numeral 170 and a pivot pin indicated by numeral 180. Second pulley 170 is disposed on frame 10. Pivot pin 180 is disposed on pet door 30. First cable 60 rises at a substantially 30 degree angle from horizontal from first pulley 50 to second pulley 170 and then descends at a substantially 90 degree angle from horizontal to pivot pin 180 and then leads, substantially horizontally, from pivot pin 180 to proximal end 60*b*.

There is also provided a counterweight means biasing the pet door towards the open position shown in FIG. 2. The counterweight means according to the preferred embodiment of this invention allows the use of a relatively small and inexpensive motor 40.

Figure 3:
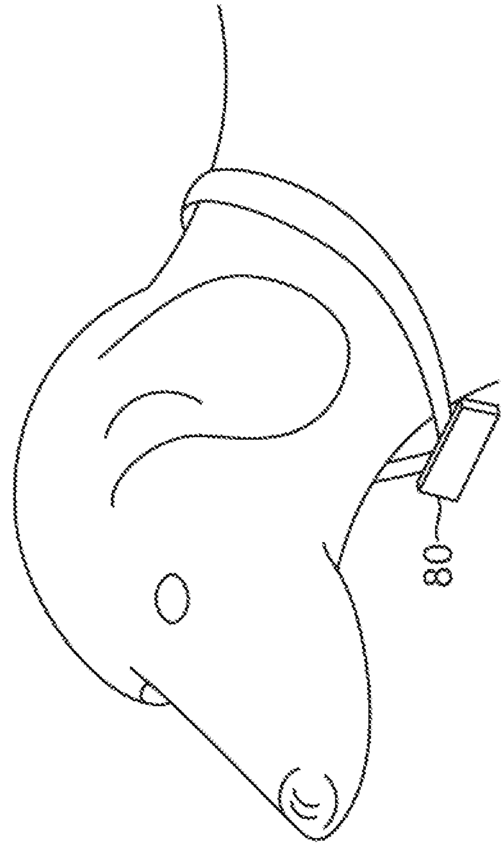
FIG. 3 shows a magnetic transmitter worn by a pet.

Viewing now FIG. 3, numeral 80 indicates a magnetic transmitter. Magnetic transmitter 80 is worn by a pet. Magnetic transmitter 80 generates a predetermined transmitter signal. There provided a detector indicated by numeral 90. Detector 90 is located proximate frame 10 (not shown in FIG. 1 and FIG. 2 but shown in FIG. 6) generating a detector signal in response to the transmitter signal when the pet wearing transmitter 80 approaches pet door at a predetermined distance from pet door 30. In the preferred embodiment, the predetermined distance ranges from about six inches to about four feet and can be adjusted by the pet owner, depending on the size of the pet.

Figure 4:
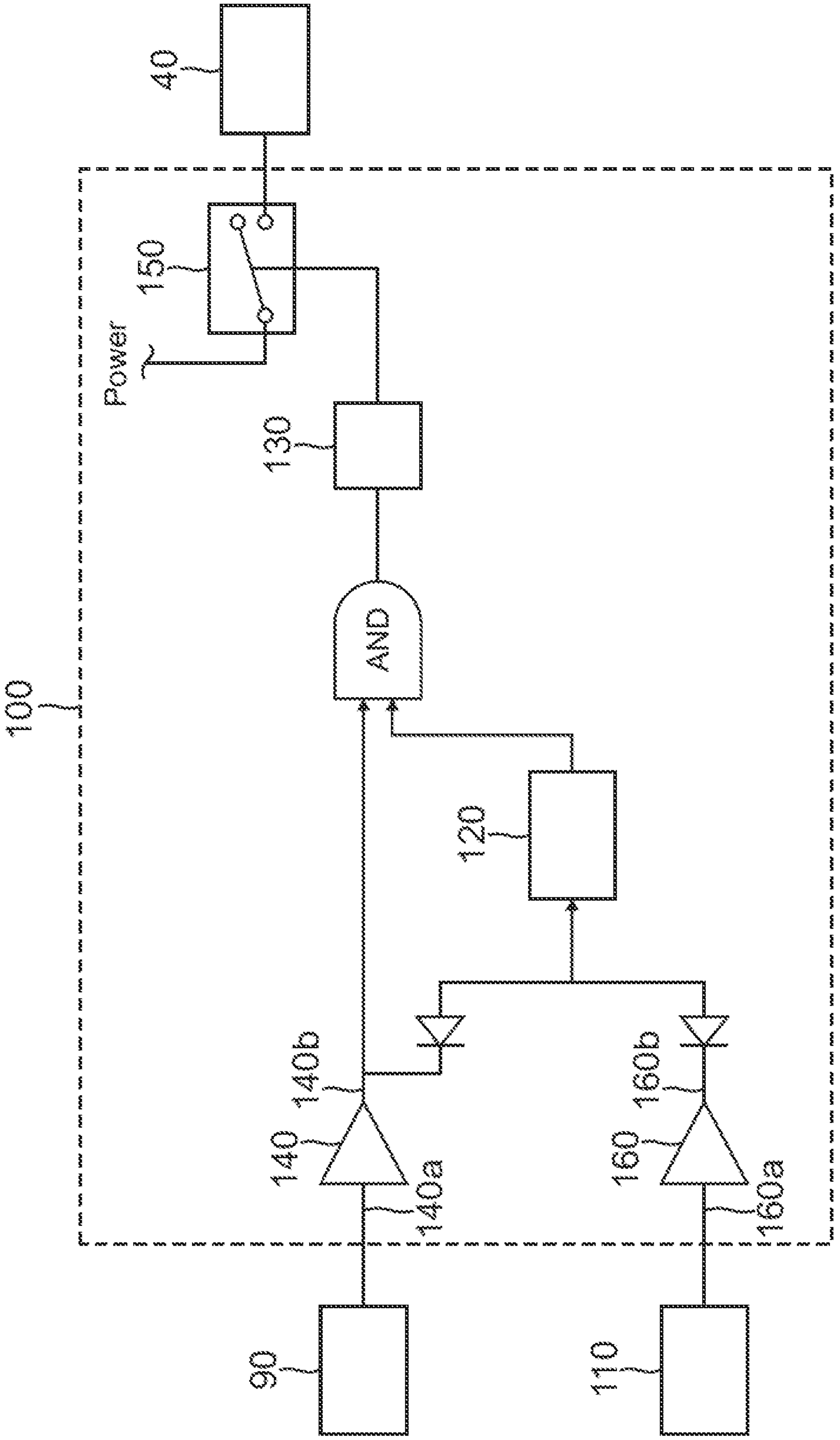
FIG. 4 shows a block diagram of a control means.

Viewing now FIG. 4, numeral 100 indicates a control means. Control means 100 engages the drive means (namely motor 40 in the preferred embodiment) to lift pet door 30 between the closed and open positions in response to the detector signal. Detector 90 has a relatively large inductance (i.e. many turns of wire), which permits it to generate a small DC voltage due to transmitter 80 moving about detector 90. When transmitter 80 is father away from detector 90 than the predetermined distance, the voltage induced in detector 90 is negligibly low.

Numeral 110 indicates a microelectromechanical systems ("MEMS") gyro. MEMS gyro 110 is disposed on the hinged door and generates a gyro signal in response to a movement of the hinged door. The gyro signal overrides the detector signal, thus preventing lifting pet door 30 between the closed and open positions. In the preferred embodiment, MEMS gyro 110 is a motion detector, even though an accelerometer MEMS gyro can be used. A motion detector gyro is preferred due its ability to sense angular motion and not just vibrations. In the preferred embodiment, the gyro signal is generated from MEMS gyro 100 X-axis sensor. However, the Y-axis sensor or Z-axis sensor can be used, depending on the orientation of MEMS gyro 110 on the hinged door.

Numeral 120 indicates a lockout timer. Lockout timer 120 prevents lifting pet door 30 between the closed and open positions during a lockout period following substantially immediately after pet door 30 returns to the closed position. The purpose of lockout timer 120 is to prevent pet door 30 from opening and closing for a period of time in the event the pet is loitering near pet door 30 and causing control means 100 to engage motor 40. In the preferred embodiment, the lockout period ranges from about ten seconds to about thirty seconds. It can be adjusted by the pet owner, based on the habits of the pet.

Numeral 130 indicates an open door timer. Open door timer 130 maintains motor 40 energized for a predetermined period of time substantially immediately following energizing in response to the detector signal. The purpose of open door timer 130 is to allow the pet to clear opening 70 without scarring the pet by a suddenly closing pet door 30. In the preferred embodiment, the predetermined period of time ranges from about one second to about ten seconds. It can be adjusted by the pet owner, based on the habits of the pet.

Numeral 140 indicates a first amplifier. First amplifier 140 is a three-stage low frequency amplifier. In the preferred embodiment, first amplifier 140 is tuned to the frequency of about 1 Hz. Through experiments, it has been determined that the frequency of about 1 Hz is advantageous due to the way the pet wearing transmitter 80 approaches or walks towards pet door 30.

First amplifier 140 has a first amplifier input indicated by numeral 140*a* and a first amplifier output indicated by numeral 140*b*. First amplifier output 140*h* is connected, through open door timer 130, to a power switch indicated by numeral 150. Power switch 150 can be placed in an on position and in an off position. When power switch 150 is in the on position, motor 40 is energized. In the preferred embodiment, power switch 150 is an electronic switch, such as a power Triac, turned in the on position by a logic "1" level and turned in the off position by a logic "0".

The detector signal applied by detector 90 to first amplifier input 140*a* causes first amplifier 140 to output a detector signal pulse at first amplifier output 140*b*. Said detector signal pulse causes power switch 150 to be placed in the on position during the predetermined period (which is, as discussed above, ranges from about one second to about ten seconds).

Numeral 160 indicates a second amplifier. Second amplifier 160 is also a three-stage low frequency amplifier. Second amplifier 160 has a second amplifier input indicated by numeral 160*a* and a second amplifier output indicated by numeral 160*b*. Second amplifier input 160*a* is connected to MEMS gyro 110. Second amplifier output 160*b* is connected to lockout timer 120. Lockout timer 120 is connected, through open door timer 130, to power switch 150.

The gyro signal applied to second amplifier input 160*a* causes second amplifier 160 to output a gyro signal pulse at second amplifier output 160*b*. Said gyro signal pulse causes lockout timer 120 to engage, thus placing power switch 150 in the off position and preventing lifting pet door 30 between the closed and open positions.

If the detector signal and the gyro signal occur simultaneously (i.e. when the pet approaches pet door 30 and the pet owner starts opening the hinged door at the same time), the gyro signal pulse occurs slightly before the detector signal pulse. This engages lockout timer 120 before open door timer 130 has the opportunity to be engaged by the detector signal pulse and keeps pet door 30 from being lifted between the closed and open positions.

FIG. 4 also shows an AND-gate to which first amplifier output 140*b* and lockout timer 120 are connected on one side and open door timer 130 on the other side. Absent the gyro signal pulse, the detector signal pulse engages, simultaneously via the AND-gate, open door timer 130 and lockout timer 120. This places power switch 150 in the on position for the predetermined period, after which the power switch is placed in the off position, motor 40 is de-energized and pet door 30 is returned in the closed position. After that, lockout timer 120 that had been engaged by the detector signal pulse keeps power switch 150 in the off position during the lockout period after pet door 30 is returned in the closed position. After the lockout period, lockout timer 120 allows open door timer 130 to be re-engaged for another cycle of opening pet door 30.

FIG. 4 also shows an OR-gate comprising a pair of diodes connected to first amplifier output 140*b* and second amplifier output 160*b* on one side and to lockout timer 120 on the other side. First amplifier 140 is made to respond to the detector signal slightly slower than second amplifier 160 responding to the gyro signal. Thus, the gyro signal pulse occurs slightly before the detector signal pulse, even if the detector signal and the gyro signal occur simultaneously. Accordingly, pet door 30 is prevented from being lifter in the open position either when the hinged door moves first or when the hinged door movement and the detector signal occur simultaneously.

Figure 5:
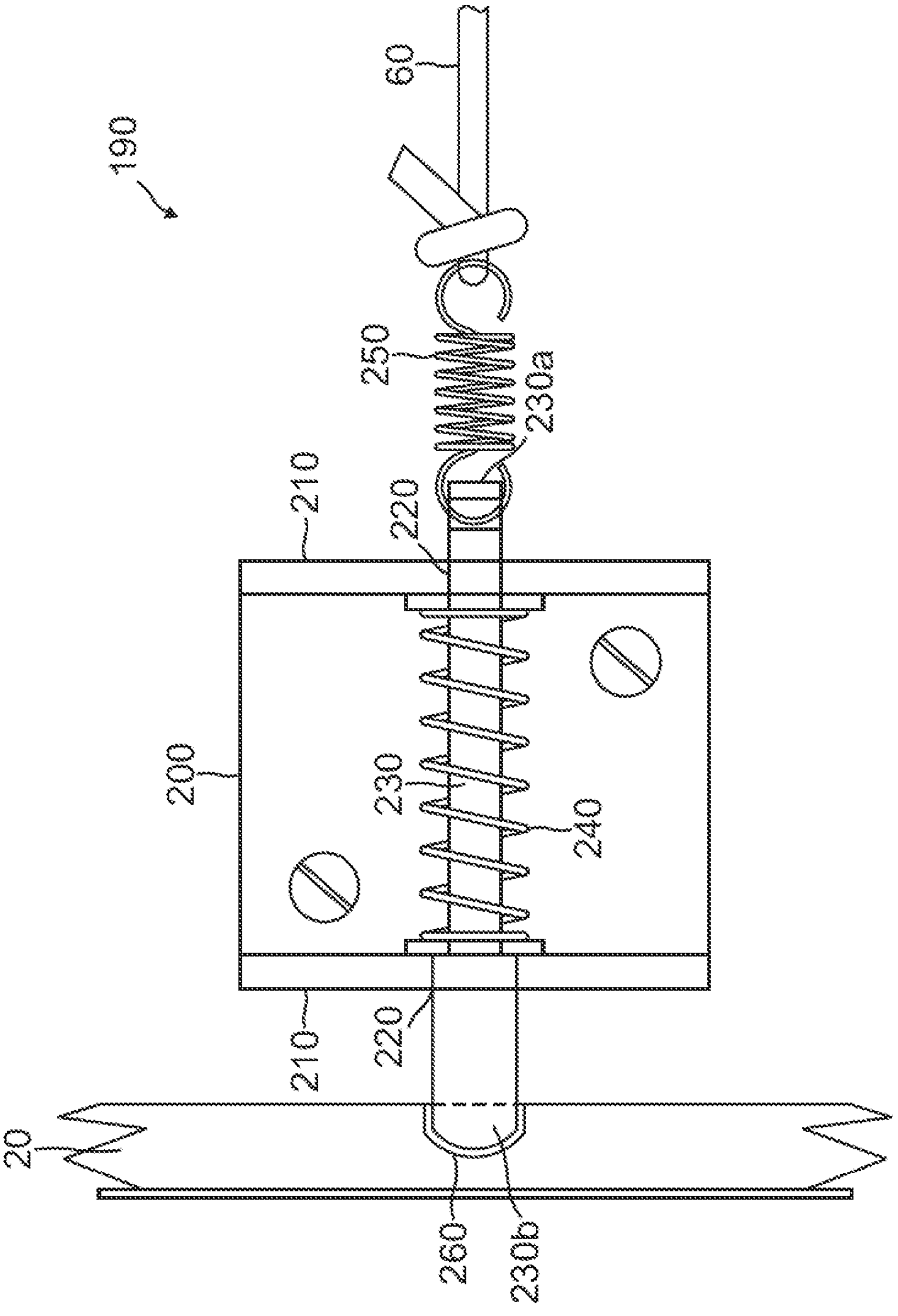
FIG. 5 shows a locking means.

Viewing now FIG. 5, numeral 190 indicates a locking means. Locking means 190 comprises a U-shaped bracket indicated by numeral 200. U-shaped bracket 200 has flanges indicated by numeral 210 having a pair of holes indicated by numeral 220 therein.

Numeral 230 indicates a pin. Pin 230 has a proximate end indicated by numeral 230*a* and a distal end indicated by numeral 2301. Pin 230 is disposed substantially horizontally within holes 220, such that proximate end 230*a* and distal end 230*b* project outside flanges 210.

Numeral 240 indicates a compression spring. Compression spring 240 is disposed between flanges 210 and is biasing pin 230 towards distal end 230*b*.

Numeral 250 indicates a tension spring. Tension spring 250 has one end attached to proximate end 230*a* and the other end attached to second end 60*b* of first cable 60.

There is also a pin hole indicated by numeral 260 disposed in column 20, pin hole 260 receiving and engaging with distal end 230*b* when pet door 30 is lowered in the closed position, thereby preventing lifting pet door 30 by an external force.

Figure 6:
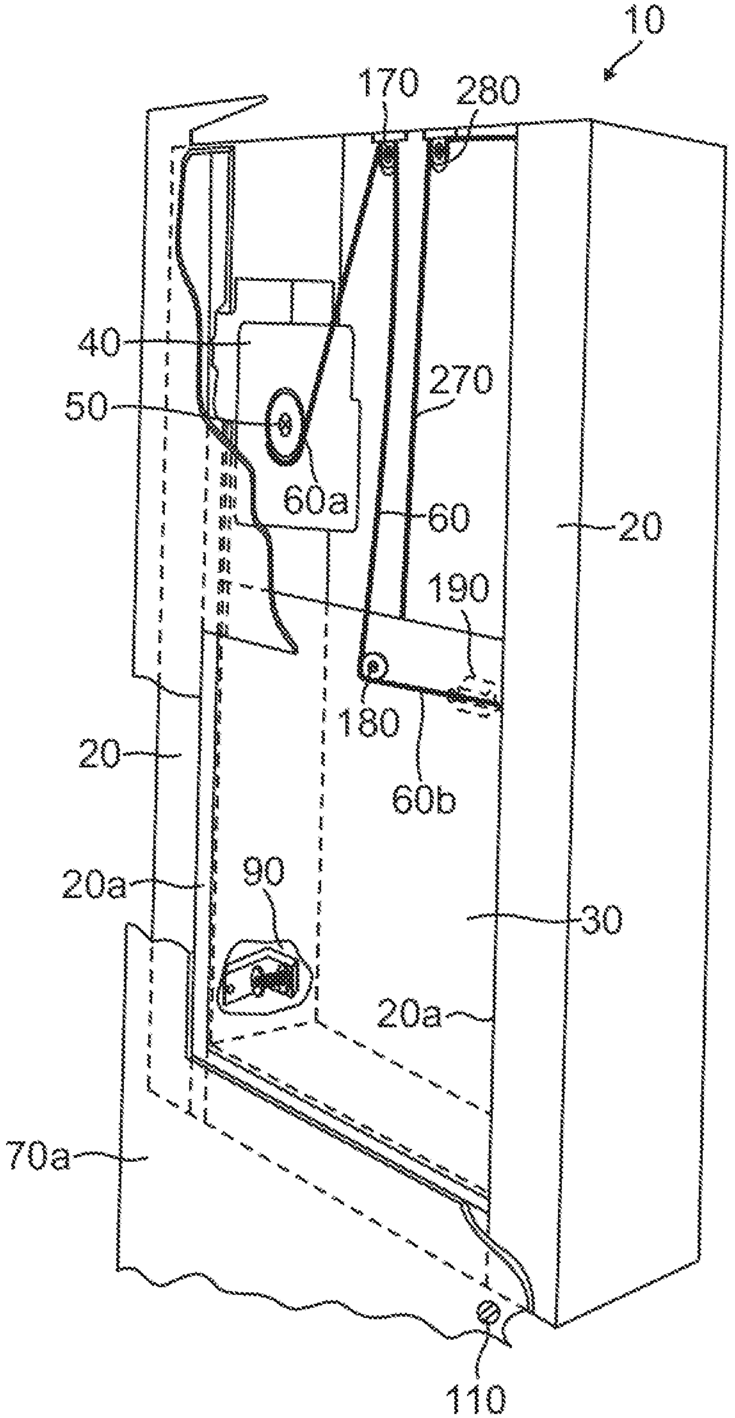
FIG. 6 shows an isometric view of an automatic pet door for large pets according to the preferred embodiment of this invention with the pet door in the closed position.

Viewing now FIG. 6, numeral 70*a* indicates the hinged door. MEMS gyro 110 is disposed on hinged door 70*a*. Detector 90 is located proximate to frame 10. Detector 90 is shown in FIG. 6 as an induction coil having about ten thousand windings.

Viewing again FIG. 1 and FIG. 2, numeral 270 indicates a second cable. Second cable 270 comprises a proximal end indicated by numeral 270*a* and a distal end indicated by numeral 270*b*. Proximal end 270*a* is fixedly attached to pet door 30.

Numeral 280 indicates a third pulley. Third pulley 280 is disposed on frame 10.

Numeral 290 indicates a fourth pulley. Fourth pulley 290 is disposed in one of outer tubes 20.

Numeral 300 indicates an inner tube. Inner tube 300 comprises a circular cross section and is disposed in the same outer tube 20 as fourth pulley 290. Inner tube 300 is fixedly attached to outer tube 20. In the preferred embodiment, inner tube 300 is attached to outer tube by way of a screw. Inner tube 300 is preferably made of plastic.

Numeral 310 indicates a metal rod. Metal rod is affixed to distal end 270*b*. Metal rod 310 slidably moves inside inner tube 300 between a bottom position when pet door 30 is in the open position shown in FIG. 2 and a top position when pet door 30 is in the closed position shown in FIG. 2. Metal rod 310 in the preferred embodiment has a circular cross section and weighs less than 10 lb to act as a counterweight for pet door 30 that weighs about 10 lb.

Second cable 270 feeds over third pulley 280 and fourth pulley 290.

In the preferred embodiment, the counterweight comprises second cable 270, third pulley 280, fourth pulley 290, inner tube 300 and metal rod 310. The weight of metal rod 310 biases pet door 30 towards the open position shown in FIG. 2, thus allowing the use of a relatively small and inexpensive motor 40.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. An automatic pet door system comprising:

(a) a substantially rectangular frame disposed over an opening in a hinged door, wherein a lower portion of the frame defines a passage through the opening;

(b) a pet door moveable between a lower closed position for closing the passage and an upper open position for opening the passage;

(c) a drive means lifting the pet door between the closed and open positions;

(d) a magnetic transmitter worn by a pet, the magnetic transmitter generating a predetermined transmitter signal;

(e) a detector located proximate the frame, the detector generating a detector signal in response to the transmitter signal when the pet approaches the pet door at a predetermined distance from the pet door;

(f) a control means engaging the drive means to lift the pet door between the closed and open positions in response to the detector signal;

(g) a microelectromechanical systems gyro disposed on the hinged door, the microelectromechanical systems gyro generating a gyro signal in response to a movement of the hinged door, the gyro signal overriding the detector signal, thus preventing lifting the pet door between the closed and open positions;

(h) a counterweight means biasing the pet door towards the open position;

wherein the frame comprises two substantially parallel vertical outer tubes, each outer tube comprising a rectangular cross section and a channel disposed along the length of the outer tube, such that openings of the channels are facing each other and slidably receiving the pet door;

wherein the drive means comprises:

a motor disposed on the frame;

a first pulley disposed on the motor;

a first cable having a first end fixedly attached to the first pulley and a second end fixedly attached to the pet door;

wherein the motor, when energized, spinning the first pulley thereby causing the first cable to pull the pet door up to the open position, and wherein the motor, when not energized, allowing the pet door to move down to the closed position by way of the force of gravity;

wherein the drive means further comprises:

a second pulley disposed on the frame;

a pivot pin disposed on the pet door:

a locking means disposed on the pet door, the locking means preventing movement of the pet door upwardly from the closed position unless the pet door is moved by way of the motor;

wherein the second end is fixedly attached to the locking means and wherein the first cable is feeding over the second pulley and through the pivot pin;

wherein the counterweight means further comprises:

a second cable comprising a proximal end and a distal end, the proximal end fixedly attached to the pet door;

a third pulley disposed on the frame;

a fourth pulley disposed in one of the outer tubes;

an inner tube comprising a circular cross section, the inner tube disposed in the same outer tube as the fourth pulley, the inner tube fixedly attached to the outer tube;

a metal rod affixed to the distal end, the metal rod slidably moving inside the inner tube between a bottom position when the pet door is in the open position and a top position when the pet door is in the closed position;

wherein the second cable feeding over the third and fourth pulleys.

2. The automatic pet door system as in claim 1, wherein the control means further comprises a lockout timer preventing lifting the pet door between the closed and open positions during a lockout period following substantially immediately after the pet door returns to the closed position.

3. The automatic pet door system as in claim 2, wherein the lockout period ranges from about ten seconds to about thirty seconds.

4. The automatic pet door system as in claim 3, wherein the gyro signal overrides the detector signal by way of engaging the lockout timer.

5. The automatic pet door system as in claim 4, wherein the detector means comprises an induction coil having about ten thousand windings, such that the induction coil generates the detector signal at an induction coil output in a form of a voltage induced by movement of the magnetic transmitter with respect to the induction coil.

6. The automatic pet door system as in claim 5, wherein the control means further comprises an open door timer maintaining the motor energized for a predetermined period of time substantially immediately following energizing in response to the detector signal.

7. The automatic pet door system as in claim 6, wherein the predetermined period of time ranges from about one second to about ten seconds.

8. The automatic pet door system as in claim 7, wherein the control means comprises:

a first amplifier having a first amplifier input and a first amplifier output, the first amplifier input connected to the induction coil output, the first amplifier output connected, through the open door timer, to a power switch that can be placed in an on position and in an off position;

wherein the detector signal applied to the first amplifier input causes the first amplifier to output a detector signal pulse at the first amplifier output, the detector signal pulse causing the power switch to be placed in the on position during the predetermined period;

wherein placing the power switch in the on position causes the motor to be energized.

9. The automatic pet door system as in claim 8, wherein the first amplifier is tuned to the frequency of about 1 Hz.

10. The automatic pet door system as in claim 9, wherein the control means comprises:

a second amplifier having a second amplifier input and a second amplifier output, the second amplifier input connected to the microelectromechanical systems gyro, the second amplifier output connected to the lockout timer, the lockout timer connected, through the open door timer, to the power switch;

wherein the gyro signal applied to the second amplifier input causes the second amplifier to output a gyro signal pulse at the second amplifier output, the gyro signal pulse causing the lockout timer to engage and to place the power switch in the off position;

wherein if the detector signal and the gyro signal occur simultaneously, the gyro signal pulse occurs before the detector signal pulse.

11. The automatic pet door system as in claim 10, wherein the locking means comprises:

a U-shaped bracket having a pair of holes in its flanges;

a pin having a proximate end and a distal end, the pin disposed substantially horizontally within the holes, such that the proximate and distal ends project outside the flanges;

a compression spring disposed between the flanges, the compression spring biasing the pin towards the distal end;

a tension spring having one end attached to the proximate end and the other end attached to the second end of the cable;

a pin hole disposed in the column, the pin hole receiving and engaging with the distal end when the pet door is lowered in the closed position, thereby preventing lifting the pet door by an external force.

12. The automatic pet door system as in claim 11, wherein the cable is rising at a substantially 30 degree angle from horizontal from the primary pulley to the secondary pulley, descending at a substantially 90 degree angle from horizontal to the pivot pin and leading, substantially horizontally, from the pivot pin to the proximate end.

13. The automatic pet door system as in claim 12, wherein the predetermined distance from the pet door ranges from about six inches to about four feet.

* * * * *